3,834,891
HERBICIDAL COMPOSITIONS

Robert F. Husted, Florissant, and Rodney O. Radke, St. Charles, Mo., assignors to Monsanto Company, St. Louis, Mo.
No Drawing. Filed Dec. 20, 1971, Ser. No. 210,110
Int. Cl. A01n 9/24
U.S. Cl. 71—109
9 Claims

ABSTRACT OF THE DISCLOSURE

Herbicidal compositions comprising 3'-(N-orthochlorobenzyl-N-methylcarbamoyloxy) propionanilide with a substituted phenoxyacetic acid selected from the group consisting of 2,4-dichlorophenoxyacetic acid and 2-chloro-4-methylphenoxyacetic acid or their esters.

---

This invention relates to synergistic herbicidal compositions which possess herbicidal activity not shown by the individual components when employed alone.

The use of synergistic mixtures for the inhibition of plant growth permits the utilization of smaller total amount of herbicidal composition and/or smaller quantities of the individual components in the composition to obtain the same or improved results than that obtained when the higher amount of herbicidal composition is used. The use of smaller quantities of the "active ingredient" may also increase the margin of crop safety which is a very important factor in the effective commercialization of herbicides. The term "active ingredient" is used hereinafter in the specification and claims to describe the herbicidal compositions of this invention which comprises 3' - (N - orthochlorobenzyl-N-methylcarbamoyloxy) propionanilide with a substituted phenoxyacetic acid or ester selected from the group consisting of 2,4-dichlorophenoxyacetic acid and 2-methyl-4-chlorophenoxyacetic acid and their esters in which the ester grouping is derived from alkanols having a maximum of ten carbon atoms.

The term "plant" as used herein and in the appended claims is inclusive of dormant seeds, germinant seeds, germinative seeds, emerging seedlings and established woody and herbaceous vegetation including the roots and established woody and herbaceous vegetation including the roots and above-ground portions.

The preparation of the substituted phenoxyacetic acid is by known means. Preparation of 3'-(orthochlorobenzyl-N-methylcarbamoyloxy)-propionanilide is by the reaction of 3-hydroxy propionanilide with N-orthochlorobenzyl-N-methyl chlorocarbamate in the presence of pyridine and by other known means.

Preferred substituted phenoxyacetic acids for use in this invention include, but are not limited, to 2,4-dichlorophenoxyacetic acid, isopropyl 2,4-dichlorophenoxyacetate, butyl 2,4-dichlorophenoxyacetate, octyl 2,4-dichlorophenoxyacetate, isooctyl 2,4-dichlorophenoxyacetate, 2-methyl-4-chlorophenoxyacetic acid, isopropyl 2-methyl-4-chlorophenoxyacetate, propyl 2 - methyl - 4 - chlorophenoxyacetate, butyl 2-methyl-4-chlorophenoxyacetate, octyl 2-methyl-4-chlorophenoxyacetate and isooctyl 2-methyl-4-chlorophenoxyacetate.

The following data obtained during field applications of the synergistic mixtures of the present invention illustrate the improved response obtained utilizing the herbicidal compositions of this invention.

TABLE I.—POSTEMERGENT ACTIVITY ON BARNYARD GRASS EARLY SEASON

| Compound | Rate (lbs.-/acre) | Percent inhibition |
|---|---|---|
| B | ⅛ | 0 |
| Mixture A plus B | ⅛+⅛ | 0 |
| A | ¼ | 0 |
| B | ¼ | 0 |
| Mixture A plus B | ¼+¼ | 3 |
| A | ½ | 0 |
| B | ½ | 0 |
| Mixture A plus B | ½+½ | 10 |
| A | 1 | 0 |
| B | 1 | 3 |
| Mixture A plus B | 1+1 | 40 |
| A | 2 | 3 |
| B | 2 | 20 |
| Mixture A plus B | 2+2 | 85 |
| A | 4 | 13 |

NOTE.—Compound A=3'(N-orthochlorobenzyl-N-methylcarbamoyloxy)-propionanilide; Compound B=Iso-octyl-2,4-dichlorophenoxyacetate.

TABLE II.—POSTEMERGENT ACTIVITY ON GIANT FOXTAIL EARLY SEASON

| Compound | Rate (lbs.-/acre) | Percent inhibition |
|---|---|---|
| B | ⅛ | 0 |
| Mixture A plus B | ⅛+⅛ | 45 |
| A | ¼ | 0 |
| B | ¼ | 15 |
| Mixture A plus B | ¼+¼ | 71 |
| A | ½ | 0 |
| B | ½ | 45 |
| Mixture A plus B | ½+½ | 86 |
| A | 1 | 0 |
| B | 1 | 63 |
| Mixture A plus B | 1+1 | 91 |
| A | 2 | 5 |
| B | 2 | 73 |
| Mixture A plus B | 2+2 | 93 |
| A | 4 | 25 |

See footnote bottom of Table I.

Utilizing the same mixture ratio as reported in Tables III, IV and V, no decrease in herbicidal activity was noted for the mixtures over the individual components was noted on pigweed, lamb's-quarter and carpetweed.

TABLE III.—POSTEMERGENT ACTIVITY ON BARNYARD GRASS LATE SEASON

| Compound | Rate (lbs./acre) | Percent inhibition |
|---|---|---|
| B | ⅛ | 0 |
| Mixture A plus B | ⅛+⅛ | 0 |
| A | ¼ | 0 |
| B | ¼ | 0 |
| Mixture A plus B | ¼+¼ | 0 |
| A | ½ | 0 |
| B | ½ | 0 |
| Mixture A plus B | ½+½ | 0 |
| A | 1 | 0 |
| B | 1 | 0 |
| Mixture A plus B | 1+1 | 0 |
| A | 2 | 0 |
| B | 2 | 0 |
| Mixture A plus B | 2+2 | 15 |
| A | 4 | 5 |

See footnote bottom of Table I.

TABLE IV.—POSTEMERGENT ACTIVITY ON GIANT FOXTAIL LATE SEASON

| Compound | Rate (lbs./acre) | Percent inhibition |
|---|---|---|
| B | ⅛ | 0 |
| Mixture A plus B | ⅛+⅛ | 3 |
| A | ¼ | 0 |
| B | ¼ | 0 |
| Mixture A plus B | ¼+¼ | 10 |
| A | ½ | 0 |
| B | ½ | 5 |
| Mixture A plus B | ½+½ | 35 |
| AL | 1 | 10 |
| B | 1 | 13 |
| Mixture A plus B | 1+1 | 45 |
| A | 2 | 15 |
| B | 2 | 35 |
| Mixture A plus B | 2+2 | 50 |
| A | 4 | 35 |

See footnote bottom of Table I.

TABLE V.—POSTEMERGENT ACTIVITY ON MORNING GLORY

| Compound | Rate (lbs-/acre) | Percent inhibition |
|---|---|---|
| B | 1/8 | 81 |
| Mixture A plus B | 1/8+1/8 | 95 |
| A | 1/4 | 0 |
| B | 1/4 | 85 |
| Mixture A plus B | 1/4+1/4 | 93 |
| A | 1/2 | 0 |
| B | 1/2 | 87 |
| Mixture A plus B | 1/2+1/2 | 95 |
| A | 1 | 0 |
| B | 1 | 94 |
| Mixture A plus B | 1+1 | 94 |
| A | 2 | 5 |
| B | 2 | 98 |
| Mixture A plus B | 2+2 | 99 |
| A | 4 | 10 |

See footnote bottom of Table I.

Comparable results to those shown in Tables I through V are obtained utilizing mixtures comprising 0.25 to 4 parts by weight of the substituted phenoxyacetic compound to 1 part by weight of 3'-(N-orthochlorobenzyl-N-methyl carbamoyloxy) propionanilide.

The herbicidal compositions of this invention can be admixed with one or more adjuvants which can be solid or liquid extenders, carriers, diluents, conditioning agents and the like. Preferred herbicidal formulations containing the active ingredients of this invention have been developed so that the active ingredients can be used to the greatest advantage to modify the growth of plants. The preferred formulations comprise wettable powders, aqueous suspensions, dust formulations, granules, emulsifiable oils and solutions in solvents. In general, these preferred formulations can all contain one or more surface active agents.

Surface-active agents which can be used in the herbicidal formulations of this invention are set out, for example, in Searle U.S. Pat. 2,426,417; Todd U.S. Pat. 2,655,447; Jones U.S. Pat. 2,412,510; and Lenher U.S. Pat. 2,139,276. A detailed list of such agents is also set forth by J. W. McCutcheon in "Soap and Chemical Specialties," November 1947, page 811 et seq., entitled "Synthetic Detergents"; "Detergents and Emulsifiers—Up to Date" (1960), by J. W. McCutcheon, Inc., and Bulletin E-607 of the Bureau of Entomology and Plant Quarantine of the U.S.D.A. In general, less than 50 parts by weight of the surface-active agent is present per 100 parts by weight of the herbicidal composition.

Wettable powders are water-dispersible formulations containing one or more active ingredients, an inert solid extender and one or more wetting and dispersing agents. The inert solid extenders are usually of mineral origin such as the natural clays, diatomaceous earth and synthetic minerals derived from silica and silicate. Examples of such extenders include kaolinites, attapulgite clay and synthetic magnesium silicate.

Preferred wetting agents are alkyl benzene and alkyl naphthalene sulfonates, sulfated fatty alcohols, amines or acid amides; long chain acid esters of sodium isothionate, esters of sodium sulfosuccinate, sulfated or sulfonated fatty acid esters, petroleum sulfonates, sulfonated vegetable oils and ditertiary acetylinic glycols, polyoxyethylene derivatives of alkylphenol (particularly isooctylphenol and nonylphenol) and polyoxyethylene derivatives of the mono-higher fatty esters of hexitol anhydrides (e.g., sorbitan). Preferred dispersants are methyl cellulose polyvinyl alcohols, sodium lignin sulfonates, polymeric alkyl naphthalene sulfonates, sodium naphthalene sulfonate, polymethylene bisnaphthalenesulfonate and sodium N-methyl-N-(long chain acid) taurates.

Wettable powder formulations of this invention usually contain from about 5 to about 95 parts of active ingredient, from about 0.25 to 25 parts by weight of wetting agent, from about 0.25 to about 25 parts by weight of dispersant and from about 4.5 to about 94.5 parts by weight of inert solid extender, all parts being by weight of the total formulation. Where required from about 0.1 to 2.0 parts by weight of the solid inert extender can be replaced by a corrosion inhibitor or anti-foaming agent or both.

Aqueous suspensions can be prepared by mixing together and griding an aqueous slurry of water-insoluble active ingredient in the presence of dispersing agents to obtain a concentrated slurry of very finely-divided particles. The resulting concentrated aqueous suspension is characterized by its extremely small particle size, so that when diluted and sprayed, coverage is very uniform.

Dusts are dense finely-divided particulate formulations which are intended for application to the soil in dry from. Dusts are characterized by their free-flowing and rapid settling properties so that they are not readily wind-borne to areas where they are of no value. Dusts contain primarily an active ingredient and a dense, free-flowing, finely-divided particulate extender. However, their performance is sometimes aided by the inclusion of a wetting agent such as those listed hereinbefore under wettable powder compositions and convenience in manufacture frequently demands the inclusion of an inert, absorptive grinding aid. Suitable class of grinding aids are natural clays, diatomaceous earth and synthetic minerals derived from silica or silicate. Preferred grinding aids include attapulgite clay, diatomaceous silica, synthetic fine silica and synthetic calcium and magnesium silicates.

The inert finely-divided solid extender for the dusts can be of vegetable or mineral origin. The solid extenders are characterized by possessing relatively low surface areas and are poor in liquid absorption. Suitable inert solid extenders for herbicidal dusts include micaceous talcs, pyrophyllite, dense kaolin clays, ground calcium phosphate rock and tobacco dust. The dusts usually contain from about 0.5 to 99 parts active ingredient, 0 to 50 parts grinding aid, 0 to 50 parts wetting agent and 5 to 99.5 parts dense solid extender, all parts being by weight based on the total weight of the dust.

The wettable powders described above may also be used in the preparation of dusts. While such wettable powders could be used directly in dust form, it is more advantageous to dilute them by blending with the dense dust diluent. In this manner, dispersing agents, corrosion inhibitors, and anti-foam agents may also be found as components of a dust.

Emulsifiable oils are usually solutions of active ingredient in water-immiscible solvents together with a surface-active agent. Suitable solvents for the active ingredient of this invention include hydrocarbons and water-immiscible ethers, esters or ketones. Suitable surfactants are anionic, cationic and non-ionic such as alkyl aryl polyethoxy alcohols, alkyl and alkyl aryl polyether alcohols, polyethylene glycol fatty esters, fatty alkyllol amide condensates, amine salts of fatty alcohol sulfates together with long chain alcohols and oil soluble petroleum sulfonates or mixtures thereof. The emulsifiable oil compositions generally contain from about 5 to 95 parts active ingredient, about 1 to 50 parts surface-active agent and about 4 to 94 parts solvent, all parts being by weight based on the total weight of emulsifiable oil.

Granules are physically stable particulate formulations comprising active ingredient adhering to or distributed through a basic matrix of an inert, finely-divided particulate extender. In order to aid leaching of the active ingredient from the particulate, the surfactant such as those listed hereinbefore under wettable powders can be present in the composition. Natural clays, pyrophyllites and vermiculite are examples of operable classes of particulate mineral extenders. The preferred extenders are the porous, absorptive, preformed particles such as preformed and screened particulate attapulgite or heat expended, particulate vermiculite, and the finely-divided clays such as kaolin clays, hydrated attapulgite or bentonitic clays. These extenders are sprayed or blended with the active ingredient to form the herbicidal formulations.

The mineral particles which are used in the herbicidal formulation of this invention usually have a size range of 10 to 100 mesh, but preferably such that a large majority of the particles have from 14 to 60 mesh with the optimum size being from 20 to 40 mesh. Clay having substantially all particles between 14 and 80 mesh and at least about 80 percent between 20 and 40 mesh is particularly preferred for use in the present granular compositions. The term "mesh" as used herein means U.S. Sieve Series.

The granular herbicidal formulations of this invention generally contain from about 5 parts to about 30 parts by weight of active ingredient per 100 parts by weight of clay and 0 to about 5 parts by weight of surface active agent per 100 parts by weight of particulate clay. The preferred granular formulations contain from about 10 parts to about 25 parts by weight of active ingredient per 100 parts by weight of clay.

When operating in accordance with the present invention, effective amounts of the active ingredients are dispersed in or on soil and/or applied to above ground portions of plants in any convenient fashion. Application to the soil or growth media can be carried out by simply admixing with the soil, by applying to the surface of the soil and thereafter dragging or discing into the soil to the desired depth, or by employing a liquid carrier to accomplish the penetration and impregnation. The application of liquid and particulate solid herbicidal formulations to the surface of soil or to above ground portions of plants can be carried out by conventional methods, e.g., power dusters, boom and hand sprayers and spray dusters. The formulations can also be applied from airplanes as a dust or a spray because of their effectiveness at low dosages. In a further method, the distribution of the active ingredients in soil can be carried out by admixture with the water employed to irrigate the soil. In such procedures, the amount of water can be varied with the porosity and water holding capacity of the soil to obtain the desired depth of distribution of the herbicide.

In applications to soil for the inhibition of the growth of germinant seeds, germinative seeds, emerging seedlings and established vegetation, the active ingredients are applied in amounts from about 0.1 to about 4 or more pounds per acre. It is believed that one skilled in the art can readily determine from the teachings of this specification, including examples, the application rate for any situation.

The term "soil" is employed in the present specification and claims in its broadest sense to be inclusive of all conventional "soils" as defined in Webster's New International Dictionary, Second Edition, Unabridged (1961). Thus, the term refers to any substance or media in which vegetation may take root and grow, and is intended to include not only earth but also compost, manure, muck, humus, sand and the like, adapted to support plant growth.

The application of liquid and particle solid herbicidal composition of this invention to the above-ground portions of plants can be carried out by conventional methods, e.g., power dusters, boom and hand sprayers and spray dusters. The compositions can also be applied by airplanes as a dust or a spray. In general any method of applying the herbicidal compositions of this invention to the above-ground portion of the plants can be employed. The total amount of the active ingredients to be applied to the above-ground portions of plants can be from about 0.1 to about 6 pounds active ingredients per acre. It is preferred to employ the herbicidal composition of this invention in amounts of from ⅛ to 4 pounds per acre.

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the examples and description set forth herein but rather the claims be construed as encompassing all the features of patentable novelty which reside in the present invention including all features which would be treated as equivalents thereof by those skilled in the art to which the invention pertains.

What is claimed is:

1. A method for inhibiting the growth of plants which comprises contacting the plant with a herbicidally effective amount of a mixture consisting of 3'-(N-orthochlorobenzyl-N-methylcarbamoyloxy) propionanilide with a substituted phenoxyacetic acid selected from the group consisting of
    (A) 2,4,-dichlorophenoxyacetic acid;
    (B) 2-methyl-4-chlorophenoxyacetic acid; and
    (C) esters of (A) or (B), said ester grouping being derived from alcohols having a maximum of 8 carbon atoms.

2. A method in accordance with for Claim 1 in which said 3' - (N - orthochlorobenzyl-N-methylcarbamoyloxy) propionanilide and said substituted phenoxyacetic acid is the ester of 2,4-dichlorophenoxyacetic acid, said ester grouping being derived from alcohols having a maximum of 8 carbon atoms.

3. A method in accordance with Claim 2 in which said ester is the iso-octyl ester.

4. A method in accordance with Claim 1 in which said plant is barnyard grass.

5. A herbicidal composition comprising, a herbicidally effective amount of an active ingredient, said active ingredient consisting of a mixture consisting of 3'-(N-orthochlorobenzyl - N - methylcarbamoyloxy) propionanilide with a substituted phenoxyacetic acid selected from the group consisting of
    (A) 2,4-dichlorophenoxyacetic acid;
    (B) 2-methyl-4-chlorophenoxyacetic acid; and
    (C) esters of (A) or (B), said ester grouping being derived from alcohols having a maximum of 8 carbon atoms.

6. A composition in accordance with Claim 5 in which said substituted phenoxyacetic acid is the ester of 2,4-dichlorophenoxyacetic acid, said ester grouping being derived from alcohols having a maximum of 8 carbon atoms.

7. A composition in accordance with Claim 6 in which said ester is the iso-octyl ester.

8. A method in accordance with Claim 1 in which said plant is giant foxtail.

9. A method in accordance with Claim 1 in which said plant is morning glory.

References Cited
UNITED STATES PATENTS

| | | | |
|---|---|---|---|
| 3,404,975 | 10/1968 | Wilson et al. | 71—111 |
| 3,551,132 | 12/1970 | Husted | 71—118 |
| 3,592,949 | 7/1971 | Teach et al. | 71—111 |

JAMES O. THOMAS, JR., Primary Examiner

U.S. Cl. X.R.

71—110, 111, 116, 117